US007887734B2

(12) United States Patent
Sanderson

(10) Patent No.: US 7,887,734 B2
(45) Date of Patent: Feb. 15, 2011

(54) METHOD OF MANUFACTURE OF ONE-PIECE COMPOSITE PARTS WITH A POLYMER FORM THAT TRANSITIONS BETWEEN ITS GLASSY AND ELASTOMERIC STATES

(75) Inventor: Terry M. Sanderson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/404,282

(22) Filed: Mar. 14, 2009

(65) Prior Publication Data
US 2010/0230859 A1 Sep. 16, 2010

(51) Int. Cl.
B28B 7/30 (2006.01)
(52) U.S. Cl. ..................................... 264/313
(58) Field of Classification Search .................. 264/230
See application file for complete search history.

(56) References Cited

U.S. PATENT DOCUMENTS

| | | | | |
|---|---|---|---|---|
| 2,739,350 | A * | 3/1956 | Lampman | 264/313 |
| 3,013,922 | A * | 12/1961 | Fisher | 264/46.5 |
| 6,986,855 | B1 | 1/2006 | Hood | |
| 7,422,714 | B1 | 9/2008 | Hood | |
| 2006/0249626 | A1* | 11/2006 | Simpson et al. | 244/123.1 |

FOREIGN PATENT DOCUMENTS

| | | |
|---|---|---|
| DE | 2109934 A1 | 9/1972 |
| FR | 2562834 A1 | 10/1985 |
| NL | 8302819 A | 3/1985 |

OTHER PUBLICATIONS

Lendlein, A, S. Kelch, "Shape Memory Polymers" 2002, Angewandte Chemie, vol. 41, p. 2034-2057.*
Barbero et al., "Continuum damage-healing mechanics with application to self-healing composites," Internal Journal of Damage Mechanics, vol. 14, Jan. 2005, pp. 51-81.

(Continued)

Primary Examiner—Christina Johnson
Assistant Examiner—Galen Hauth
(74) Attorney, Agent, or Firm—Eric A. Gifford

(57) ABSTRACT

A polymer is formed into the shape of a one-piece composite part and then solidified by curing, setting, hardening or otherwise solidifying the polymer to form a shaped polymer form having a shape that does not draw. Composite material is laid up on the form and solidified to from the composite part. The rigidity required of the form to lay up the composite part can be provided by operating in the polymer form's glassy state, forming the shaped polymer form with a hollow core and placing a rigid insert designed to draw inside the hollow core with the polymer form in its elastomeric state or through a combination of both. In its elastomeric state the form becomes pliable (without relaxing to a different memorized shape) and can be drawn out of the one-piece composite part. Because the shape of the form does not draw, the form deforms as it is drawn. If used, the rigid insert is drawn out prior to removing the shaped polymer form. Upon removal, the polymer form in its elastomeric state returns to its original shape. The form may be used once and thrown away or reused to form multiple composite parts of the same shape.

11 Claims, 6 Drawing Sheets

OTHER PUBLICATIONS

Margraf et al., "Reflexive composites: integrated structural health management," American Institute of Aeronautics and Astronautics, AIAA Structures, Structural Dynamics, and materials Conference, Apr. 2008, pp. 1-13.

Dementsov et al., "Three-dimensional percolation modeling of self-healing composites," Physical Review E 78, 021104 (2008), pp. 1-6.

White et al, "Autonomic healing of polymer composites," Nature, vol. 409, Feb. 15, 2001, pp. 794-798.

* cited by examiner

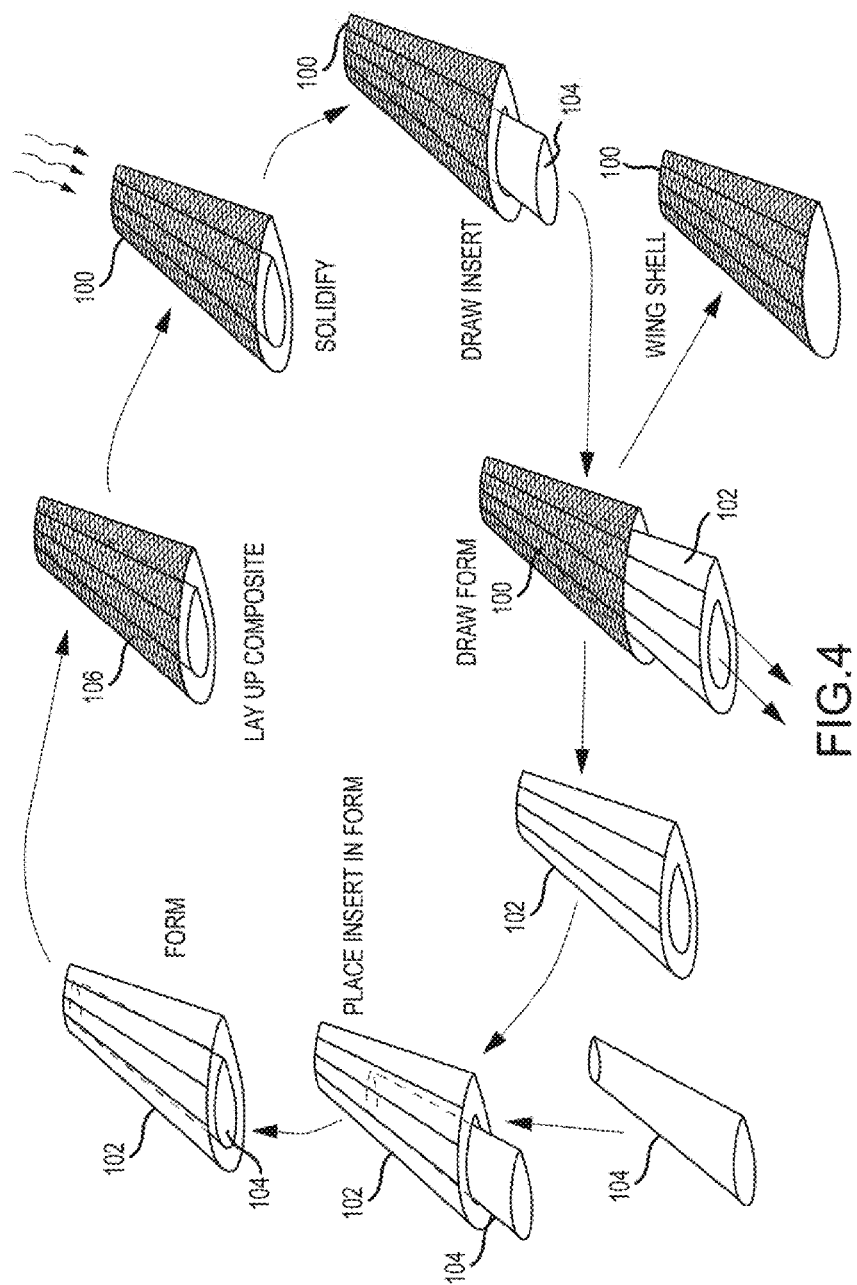

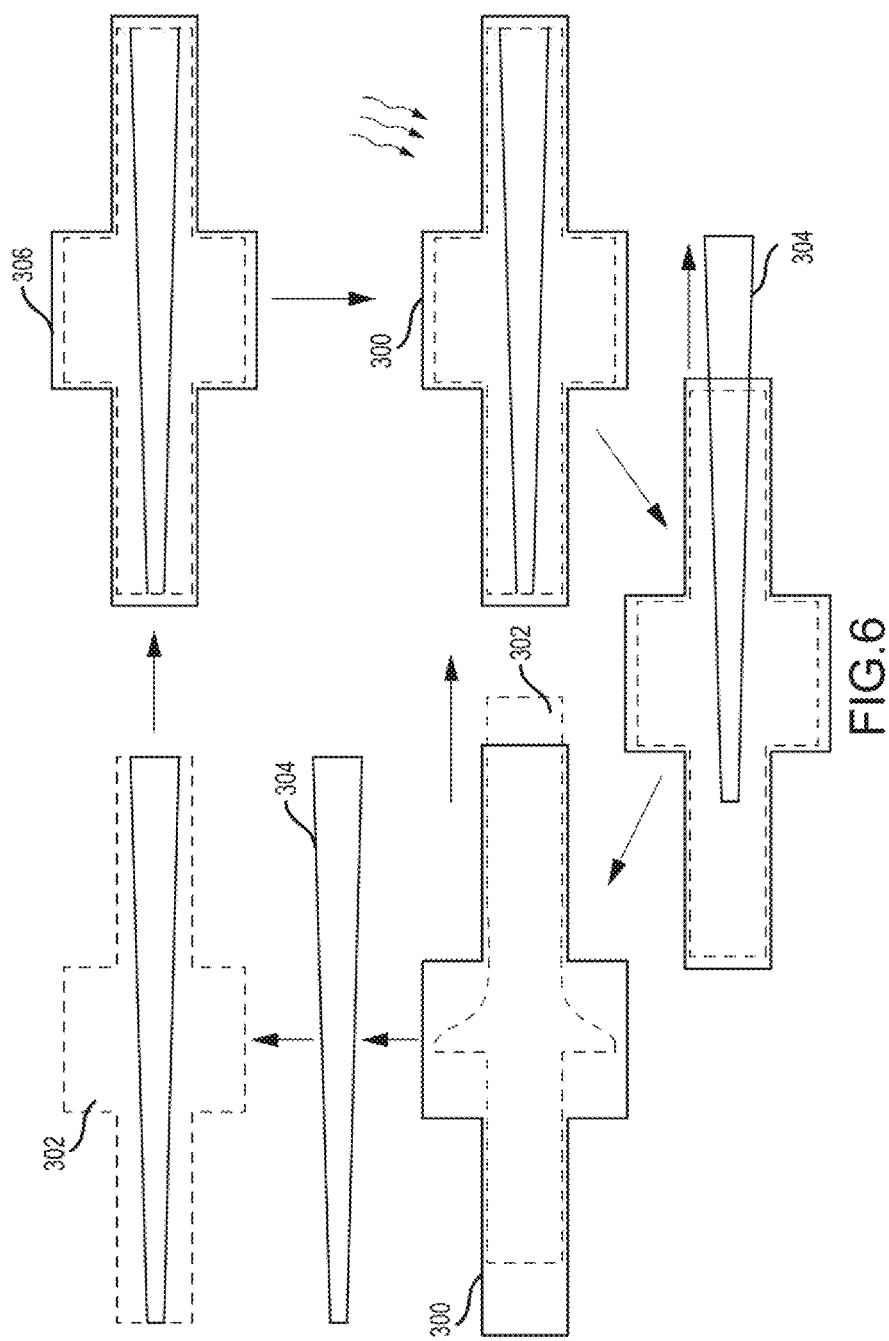

Method of Manufacture of One-Piece Composite Parts With a Polymer Form That Transitions Between Its Glassy and Elastomeric States

BACKGROUND OF THE INVENTION

1. Field of the Invention

This invention relates to the manufacture of one-piece composite parts including wings and wing shells.

2. Description of the Related Art

Known processes for fabricating castable composite parts are very complicated and expensive. A large portion of the complexity and expense is associated with manufacturing related molds. Nearly any part can be constructed as a composite part by various production methods such as filament winding, tape placement, overbraid, chop fiber roving, coating, painting, dripping, hand lay up, resin soaked, or other composite processing technique and curing process.

When these parts are manufactured using a form or mandrel, there is typically a problem with removing the form (mandrel) from the finished part. For very simple parts, the form can be "designed to draw" e.g. the form can be removed from the one-piece composite part by simply drawing (pulling) the form out of the part. For more complex parts such as a composite valve 6 as shown in FIG. 1, the form 8 does not draw. One solution is to sacrifice or destroy the form upon removal from the finished part. Another solution is to disassemble the form and remove the segments from the part. Another solution is to create a form that remains part of the final composite part. Yet another solution is to use an inflatable form that can be removed by deflating the form after the composite part is created.

U.S. Pat. No. 7,422,714 entitled "Method Of Using A Shape Memory Material As A Mandrel For Composite Part Manufacturing" is a version of an inflatable mandrel and includes the steps of "providing a pre-formed tube of Shape Memory Polymer (SMP), using a mold to deform the SMP tube to replicate the mold forming a SMP mandrel, filament winding resin soaked fibers around the deformed SMP mandrel, curing the resin, causing the deformed SMP Mandrel to return to its original smaller shape, and quickly and easily removing the SMP tube from the composite part." (see col. 4, lines 43-50). More particularly uncured SMP is molded to form the tube and cured. The "tube" being the memorized shape of the SMP. The tube is placed into a mold of the composite part, heated above its glass transition temperature at which point the SMP transforms from a rigid substance to an elastic, flexible and soft substance, "inflated" into replicate the interior of the mold and allowed to cool to below its glass transition temperature at which point the SMP transforms back to a rigid substance. The rigid deformed SMP is removed from the mold and is ready for filament winding (col. 6, lines 37-50). Once the composite part is laid up and cured on the exterior of the deformed SMP, the SMP is heated to above its glass transition temperature inducing the deformed SMP mandrel to relax to its memorized shape (not the inflated mandrel shape). The tube is then removed from the composite part. (col. 7, lines 21-39) The "tube" can be reused to form the same or different composite parts. However, the tube must be reinflated to the desired mandrel shape each time. This process requires a SMP that can deform from the memorized blank shape (tube) to the desired mandrel shape.

Air vehicles ranging from unmanned air vehicles (UAVs) of a few pounds to cruise missiles up to 10,000 pounds require strong yet lightweight and inexpensive wings. These types of air vehicles may place high loads on the wings and require the capability to maneuver rapidly. To reduce the overall cost of the air vehicles a manufacturing process for low-cost one-piece composite wings is needed.

As shown in FIG. 2, a wing 10 can be described by its length 12 ("semi-span") measured from the "root" 14 to the tip 16, width 18 ("chord length") measured at the root from the leading edge 20 to the trailing edge 22 and cross-section 24 as well as its taper 26, twist 28 and camber 30. "Taper" indicates the rate of change of the chord length 18 along the half-span of the wing from the root where the wing attaches to the airframe to the tip of the wing. Wings are tapered to control the distribution of lift along the wing span. "Twist" indicates the rotation of the cross-section 24 along an axis 32 through the half-span of the wing. Twist is provided to avoid stalling the aircraft along the entire span of the wing, allowing the pilot or control system time to recover. "Camber" is the asymmetry between the top and the bottom curves 34, 36 of the wing in cross-section. Camber affects the lift and pitching moment of the wing. Camber may vary from wing root to wing tip.

A limited class of air vehicles such as model RC (radio controlled) hobby planes and other low cost air vehicles may use wings that have no taper, twist or camber. There are a few options for manufacturing these simple wings. One common approach is an extrusion process in which aluminum is forced through a die having the desired wing cross-section to extrude the wing. Foam may be extruded in a similar process and composite material layed up on the foam to form the wing. In an alternate process, the foam may be cut and the composite laid up. In this foam process, the foam remains inside the composite shell as part of the wing. In another approach, composite material is laid up on a reusable form (machined or molded from a rigid material such as aluminum or steel), which is then drawn from the wing shell. The form is "designed to draw" from the composite wing shell.

A more general class of air vehicles including UAVs, munitions, missiles, and other tube or pylon launched air vehicles demand greater performance and may use wings formed with taper, twist and/or camber. The industry standard for manufacturing such wings is to machine the wing from a solid block of aluminum. Similarly, a block of foam can be machined and composite material laid up to form a composite wing. In both processes, an expensive machining procedure is required to form each wing that wastes considerable materials. A wing with either twist or taper cannot be extruded. A wing with twist or taper and camber cannot be laid up on a reusable form because the form will not draw out and so cannot be removed. One could form pieces of the wing e.g. top and bottom on separate rigid forms and then assemble the pieces. However, this approach does not provide a one-piece wing shell, hence wing, requires additional assembly and potentially reduces the structural integrity of the wing.

SUMMARY OF THE INVENTION

The following is a summary of the invention in order to provide a basic understanding of some aspects of die invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a low-cost method of manufacture of one-piece composite parts having shapes that do not draw and, in particular, wings and wing shells with twist or taper and camber.

This is accomplished with a shaped polymer form. A polymer is fabricated into the shape of a form for a one-piece composite part and then solidified by curing, setting, hardening or otherwise solidifying the polymer. The shaped polymer form has a shape that does not draw from the one-piece composite part. Composite material is laid up on the form and solidified to form the composite part. The stiffness desired to lay up the composite material can be provided by operating in the polymer form's glassy state, forming the shaped polymer form with a hollow core and placing a rigid insert designed to draw inside the hollow core or through a combination of both. In its elastomeric state the form becomes pliable (without relaxing to a different memorized shape) and can be drawn out of the one-piece composite part. Because the shape of the form does not draw, the form deforms as it is drawn. If used, the rigid insert is drawn out prior to removing the shaped polymer form. Upon removal, the polymer in its elastomeric state returns to its original shape for the composite part. The form may be used once and thrown away or reused to form multiple composite parts of the same shape. The polymer may be formed into the form using inexpensive processes such as compression or injection molding. This approach does not require a SMP in that it does not utilize a memorized shape and does not require the polymer to be inflated and reinflated into the desired form shape at each use.

In an embodiment, a polymer is molded into the shape of a form for a one-piece composite part and solidified. The form has a shape that does not draw from the composite part. With the polymer in its glassy state, a composite material is laid up on the form. The composite material is then solidified to form a one-piece composite part. The form is heated to transition the polymer from its glassy state to its elastomeric state and then drawn from the one-piece composite part. The act of drawing causes the form to deform so that it can be removed. Once removed the form returns to the shape of the composite part. Polymers such as SMPs that are mechanically sound in both their elastomeric and glassy states are preferred.

In another embodiment, a polymer is molded into the shape of a form for a one-piece composite part and then solidified. The form has a hollow core and a shape that does not draw from the composite part. The form is provided with a rigid insert designed to draw from its hollow core to provide rigidity. A composite material is laid up on the form. The composite material is then solidified to form a one-piece composite part. The rigid insert is drawn from the form and then the form in its elastomeric state is drawn from the one-piece composite part. The act of drawing causes the form to deform so that it can be removed. Once removed the form returns to its original shape. The insert may be inserted back into the polymer form and the form reused.

In another embodiment, a polymer is molded into the shape of a form for a one-piece composite part and then solidified. The form has a hollow core and a shape that does not draw from the composite part. The form is provided with a rigid insert designed to draw from its hollow core to provide rigidity. The form is cooled and with the polymer in its glassy state, a composite material is laid up on the form. The composite material is then solidified to form a one-piece composite part. The form is heated to transition the polymer from its glassy state to its elastomeric state. The rigid insert is drawn from the form and then the form is drawn from the one-piece composite part. The act of drawing causes the form to deform so that it can be removed. Once removed the form returns to its original shape. The insert may be inserted back into the polymer form and the form reused.

In any of these embodiments the one-piece composite part may be a one-piece composite wing shell. A form shaped for a one-piece composite wing shell having either twist or taper and camber, and typically twist, taper and camber does not draw (without deformation). To form a composite wing, foam is injected into each shell and solidified to form a one-piece composite wing. The foam may comprise open or closed cell foam or syntactic foam. A wing box may be placed inside the shell for additional structural support.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a flow diagram of an embodiment for manufacturing one-piece composite wing shells using the two-piece polymer form;

FIG. 6 is a flow diagram of an embodiment for manufacturing the one-piece composite valve shown in FIG. 1 using a two-piece polymer form.

DETAILED DESCRIPTION OF THE INVENTION

Figure 1:
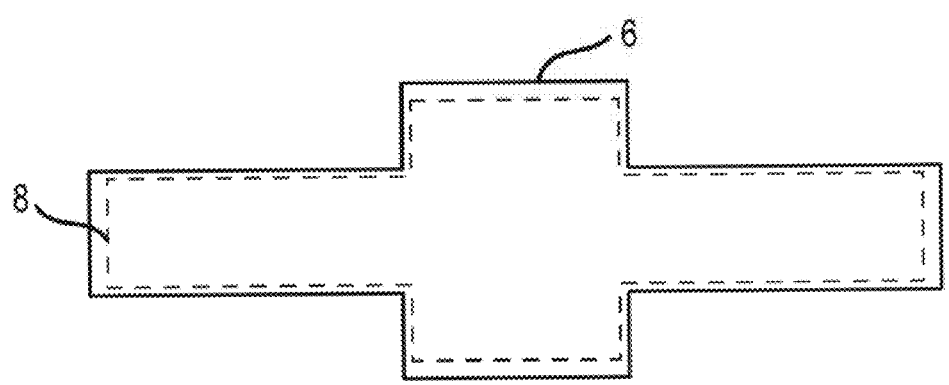
FIG. 1, as described above, illustrates a composite valve part for which the form does not draw.
Figure 2A:
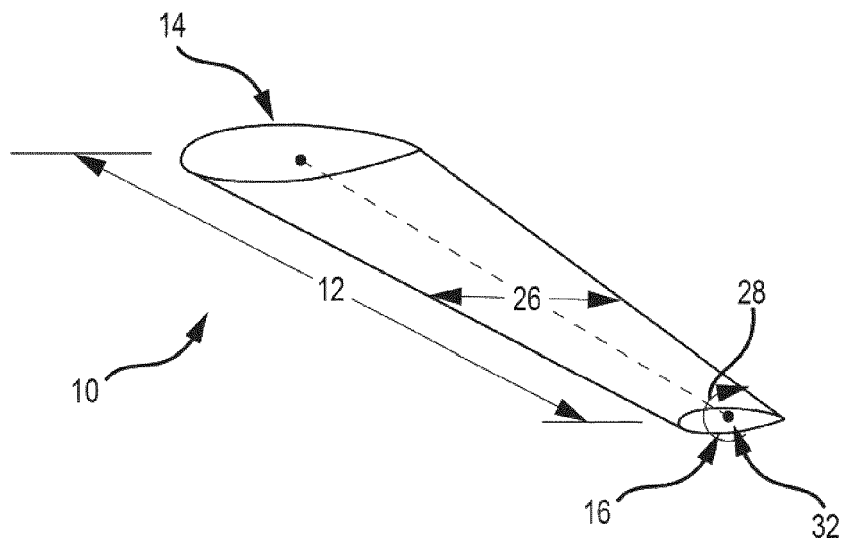
FIGS. 2a and 2b, as described above, illustrate the twist, taper and camber of a wing.
Figure 2B:
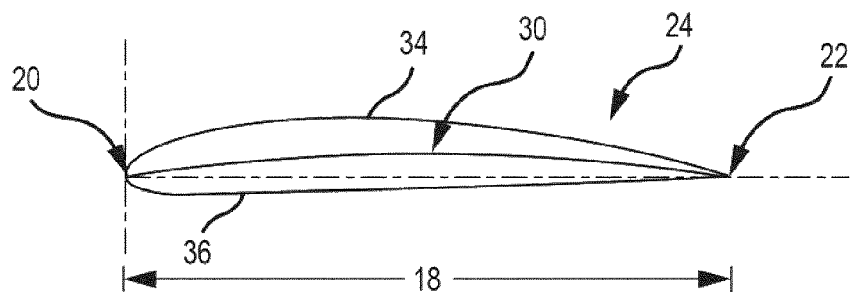

The present invention provides a low-cost method of manufacture of one-piece composite parts having shapes that do not draw and, in particular, wings and wing shells with twist or taper and camber. A polymer form is created for a one-piece composite part. This form may be manufactured using very inexpensive manufacturing processes such as compression or injection molding. The form does not have to be shaped during the manufacture of the composite parts or re-shaped to reuse the form. This may dramatically reduce the capital investment required to manufacture composite parts.

The process of manufacture using the polymer form described herein may be applied to any one-piece composite part in which the shape of the form does not draw from the one-piece composite part formed thereon. The terms "designed to draw" and "does not draw" are well known in the industry. "Designed to draw" means that the form may be pulled (or drawn) from the composite part without breaking or deforming either the composite part or the form. Conversely, a form that "does not draw" can not be pulled out of the composite part, it gets stuck. For composite wing shells, any "twist" along the span of the wing will prevent the form from being drawn. Alternately, the combination of taper and camber will prevent the form from being drawn. In many if not most airframes, the wing will exhibit twist or taper and camber and typically all three. Without loss of generality, the invention will be described for the manufacture of a composite wing shell and wing that exhibits twist, taper and camber as an exemplary embodiment of a composite part that does not draw.

A polymer is fabricated into the shape of a form for a one-piece composite part and then solidified. The shaped polymer form has a shape that does not draw from the one-piece composite part. Composite material is laid up on the form and then solidified to form the composite part. The stiffness desired to lay up the composite material can be provided by operating in the polymer form's glassy state, forming the shaped polymer form with a hollow core and placing a rigid insert designed to draw inside the hollow core or through a combination of both. In its elastomeric state the form becomes pliable (without relaxing to a different memorized shape) and can be drawn out of the one-piece composite part. Because the shape of the form does not draw, the form deforms as it is drawn. If used, the rigid insert is drawn out prior to removing the shaped polymer form. Upon removal, the polymer in its elastomeric state returns to its original shape for the composite part. The form may be used once and thrown away or reused to form multiple composite pans of the same shape.

A polymer is a large molecule (macromolecule) composed of repeating structural units typically connected by covalent chemical bonds. While polymer in popular usage suggests plastic, the term actually refers to a large class of natural and synthetic materials with a variety of properties and purposes. Many polymers are malleable which allows them to be cast, pressed, or extruded into an enormous variety of shapes. Polymers can be classified as thermoplastic and thermoset, elastomer, structural, biodegradable, electrically conductive, etc. Polymers are provided in a "stored state" in which the polymer may be a liquid or solid or at various stages of cure. Once shaped, the polymers are then "solidified" by curing, setting, hardening or otherwise solidifying. Many polymers such as elastomers cross-link when solidified. Other polymers such as thermoplastics do not cross-link. Polymers and their characteristics and methods of formulating polymers to achieve the desired characteristics are well known in the art.

Once solidified, a parameter of particular interest in synthetic polymer manufacturing is the glass transition temperature ($T_g$), which describes the temperature at which amorphous polymers undergo a second-order phase transition from a rubbery, viscous amorphous solid ("elastomeric state") to a brittle, glassy amorphous solid ("glassy state"). The glass transition temperature may be engineered by altering the degree of branching or crosslinking in the polymer or by the addition of plasticizer. Certain polymer's such as elastomers are designed to optimize their mechanical properties in the elastomeric state. Other polymers such as a polymer matrix composite are designed to optimize their mechanical properties in the glassy state. Young's Modulus quantifies the elasticity of the polymer. It is defined, for small strains, as the ratio of rate of change of stress to strain. Like tensile strength, this is highly relevant in polymer applications involving the physical properties of polymers. The modulus is strongly dependent on temperature. A polymer's Young's Modulus in its glassy state is typically at least 2-3 orders of magnitude greater than in its elastomeric state e.g. the polymer is much stiffer or rigid.

Shape Memory Polymers (SMPs) derive their name from their inherent ability to return to their original "memorized" shape after undergoing a shape deformation. SMPs that have been preformed can be deform to any desired shape while in their elastomeric state, cooled to transition to their glassy state to "lock" in the desired shape and used for some purpose such as a mandrel in Cornerstone's manufacturing process. Once the deformation is locked in, the polymer network cannot return to a relaxed state due to thermal barriers. The SMP will hold its deformed shape indefinitely. Thereafter, the SMP is heated to above its Tg whereat the SMP stored mechanical strain is released and the SMP returns to its preformed state. SMPs are used in applications in which the ability to use the polymer in a desired deformed shape and then return to the "memorized" shape is required. To support the transition between the desired shape and the relaxed memorized shape the SMP must be mechanically stable in both its glassy and elastomeric states.

Several known polymer types exhibit shape memory properties. Probably the best known and best researched polymer type exhibiting shape memory polymer properties is polyurethane polymers. Gordon, Proc of First Intl. Conf. Shape Memory and Superelastic Tech., 115-120 (1994) and Tobushi et al., Proc of First Intl. Conf. Shape Memory and Superelastic Tech., 109-114 (1994) exemplify studies directed to properties and application of shape memory polyurethanes. Another polymeric system based on crosslinking polyethylene homopolymer was reported by S. Ota, Radiat. Phys. Chem. 18, 81 (1981). A styrene-butadiene thermoplastic copolymer system was also described by Japan Kokai, JP 63-179955 to exhibit shape memory properties. Polyisoprene was also claimed to exhibit shape memory properties in Japan Kokai JP 62-192440. Another known polymeric system, disclosed by Kagami et al., Macromol. Rapid Communication, 17, 539-543 (1996), is the class of copolymers of stearyl acrylate and acrylic acid or methyl acrylate. Other SMP polymers known in the art includes articles formed of norbornene or dimethaneoctahydronapthalene homopolymers or copolymers, set forth in U.S. Pat. No. 4,831,094. Additionally, styrene copolymer based SMPs are disclosed in U.S. Pat. No. 6,759,481 which is incorporated herein by reference.

Figure 3:
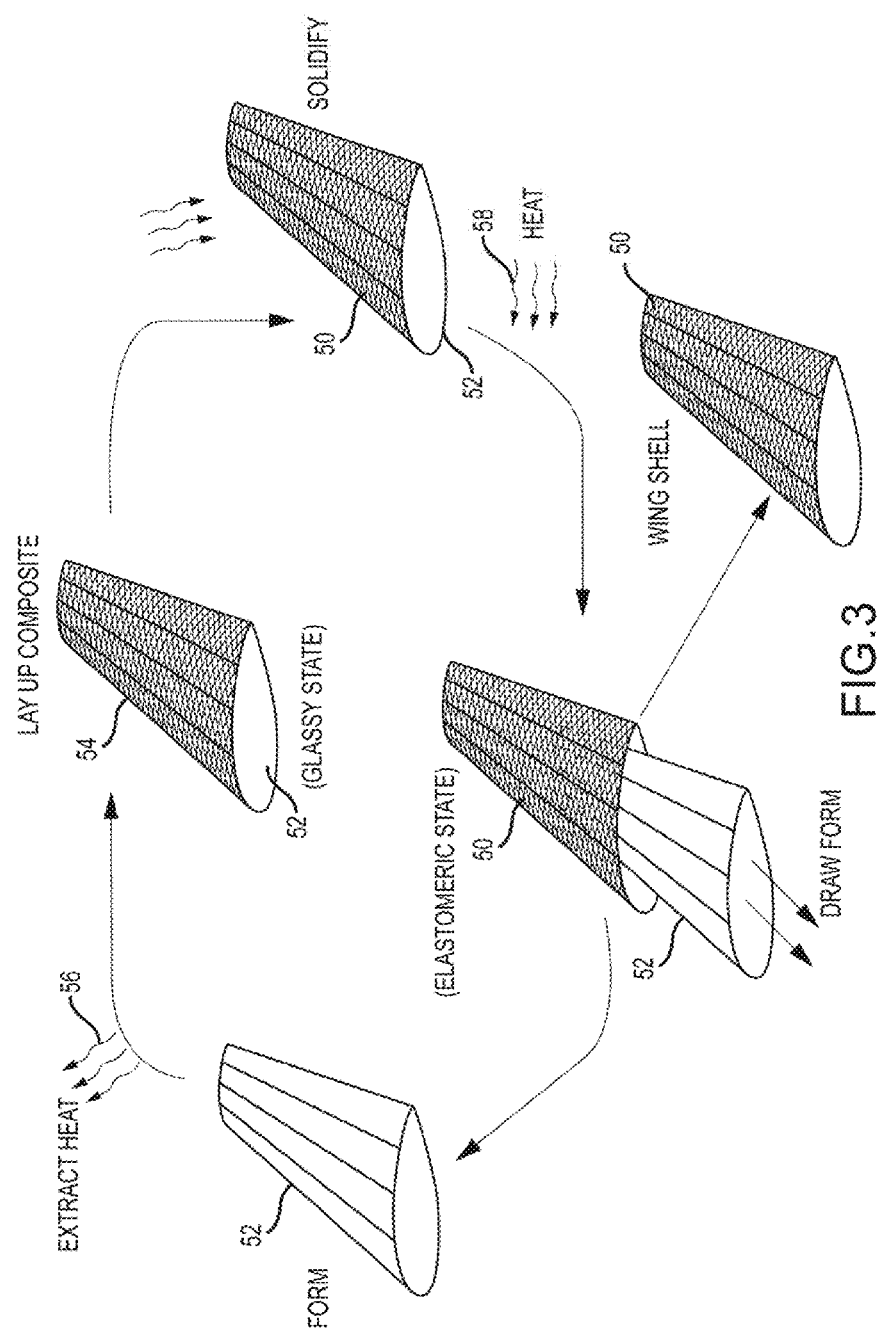
FIG. 3 is a flow diagram of an embodiment for manufacturing one-piece composite wing shells by transitioning the shaped polymer form between its glassy and elastomeric states in accordance with the present invention.

A process of manufacture of one-piece composite wing shells 50 having taper, twist and camber using a polymer form 52 that transitions between its glassy and elastomeric states is illustrated in FIG. 3.

In step 1, a polymer (in its stored state) is produced into the shape of a polymer form 52 for the one-piece composite wing shell 50 and then cured, set, hardened or otherwise solidified ("solidified"). The form reflects the specified twist or taper and camber, likely all three, of the wing shell design. As such the form "does not draw" from the composite part as commonly understood in the industry. In sizing the form, the desired thickness of the finished composite part is taken into account such that the desired final dimensions will be achieved. The form may be solid or have a hollow core.

A polymer such as an SMP is selected that has acceptable mechanical properties in both its glassy and elastomeric states. Virtually any polymer family can be made in an SMP formulation today. The choice as to which polymer is used to produce the form will be driven first by any compatibility requirements of the intended composite materials, and second by convenience (primarily cost and availability).

The form may be produced using a standard manufacturing process such as compression or injection molding. An alternate method of producing the form could consist of first growing an SLS (selective laser sintering) pattern out of a common UV curable plastic (such as a nylon, there are multiple off the shelf formulations available) in the shape and dimensions of the desired form, then casting a plastic such as epoxy around the SLS pattern to create a mold, removing the SLS pattern from the mold, and finally, casting the elastomeric or SMP form inside the mold. An aspect of this process is the ability to use inexpensive manufacturing processes to produce the form in its final shape for laying up the composite part. The form does not have to be shaped during the manufacture of the composite parts themselves or re-shaped to reuse the form. This may dramatically reduce the capital investment required to manufacture composite parts.

In step 2, composite materials 54 are laid up on polymer form 52. To provide the required stiffness or rigidity to lay up the materials, the polymer form is in its glassy state. After curing or drawing from a previously manufactured composite shell, the polymer form may be in its elastomeric state. If so, heat 56 is extracted to transition the polymer form from its elastomeric state to its glassy state prior to initiating the lay up of the composite materials.

The lay up of composite materials, which are themselves typically polymers, on a form is a well known manufacturing process. Fiber reinforcement materials could consist of carbon/graphite, aramid, or glass fibers, among others in common use today, which are readily available in many different forms including yarns, rovings, chopped strands, woven fabric, mats, etc. Filament winding could also be used. Matrix materials could include any of those commonly available today, including epoxies, polyurethanes, polyamides, BMIs (bismaleimides), etc. Common hand layup processes could also be used. The choice of reinforcement type and resin will depend first on structural design requirements, and second on convenience In step 3, the composite material 54 is then cured, set, hardened or otherwise solidified ("solidified") while on the form to create the one-piece composite wing 50. The process will depend on the requirements of the resin that was chosen, and a variety of possibilities exist. Some (for example some epoxies) will solidify in air at room temperature, some resins will require oven baking, while others still will require an autoclave to provide both heat and pressure for the process. During the process, the form may be either above or below its Tg. It is only necessary that enough support be given the part that it does not warp or otherwise deform under gravitational loading before the composite matrix has solidified.

In step 4, the polymer form 50 is drawn from inside the composite wing shell 50. Because die form is not "designed to draw" it must deform without damaging either the composite wing or itself. Accordingly, the polymer form must be in its elastomeric state. If the polymer form is not in its elastomeric state alter the solidification process, heat 58 is applied to transition to its elastomeric state. The transition from its glassy to its elastomeric state reduces the polymer form's Young's Modulus by at least 2-3 orders of magnitude making it quite pliable so that the form can be draw from the wing shell. Note, producing the form with a hollow core also makes it easier to drawn the form from the wing shell. The Tg of the polymer form will be chosen such that it is lower than the Tg of the composite matrix so as to avoid softening or decomposing the finished composite part.

It is the elastomeric properties of the form that allow it to be removed from the finished composite part. The form will warp and stretch out of its "original" shape while being removed from the composite wing shell. Once removed, the polymer form returns to its original shape and may be reused to form another one-piece composite wing shell 50 of the same size and shape. After repeated use the form may lose its shape and be discarded. Alternately, because the manufacturing processes that can be used to produce the form are so inexpensive the forms may be used only once and discarded.

It is important to note that if a SMP is used for the form, its "memorization" properties are not used. The form has only one shape; that of the one-piece composite wing shell. The form will warp and stretch out of this shape when removed but will return to its original shape naturally, without requiring or relying on the specially formulated properties of SMPs for removal. The SMP transitions from its glassy state to its elastomeric state without relaxing to a different memorized shape. In effect, the original shape is the memorized shape. In this application, a SMP is used because it is designed to provide good mechanical and other properties in both its glassy and elastomeric states, rather than for its shape memory properties.

A process of manufacture of one-piece composite wing shells 100 having taper, twist and camber using a two-piece form including a shaped polymer form 102 that does not draw and a rigid insert 104 designed to draw is illustrated in FIG. 4.

In step 1, a rigid insert 104 designed to draw from polymer form 102 is produced. The insert may be machined from metal, engineered plastics or a ceramic. The insert may be an SLS 'grown' plastic part, or it may be produced by any other common manufacturing process.

In step 2, the polymer form 102 is produced using the same process described above except that insert 104 is used as a core when the form is made. In this manner, insert 104 is "inserted" in-situ during the production of the polymer form. Alternately, a standard tooling insert could be used to produce the polymer form, removed and a different insert placed in the form. Polymer form 102 does not draw from the composite wing shell 100 but insert 104 is shaped so that it will draw out of the form, i.e. it is designed to draw. For example, the form may have a specified twist for the wing design but the insert does not have twist. Alternately, the form may have both taper and camber for the wing design but the insert does not have at least one of taper or camber.

In step 3, composite materials 106 are laid up on polymer form 102. Depending upon the size and shape of the composite wing shell, the rigid insert 104 may provide sufficient stiffness to lay up the composite materials. In these cases, the polymer may remain in its elastomeric state. The insert has stiffness or Young's Modulus at least 10× that of the polymer in its elastomeric state and more typically greater than 100× or 1,000×. This removes the requirement of having a polymer that is stable in both its elastomeric and glassy states and simplifies the manufacturing process by removing the transition back-and-forth, the polymer remains in its elastomeric state throughout the process. In other cases, it may be desired to use both the rigid insert and have the polymer form in its glassy state to lay up the composite materials. In this situation, if after curing or drawing from a previously manufactured composite shell the polymer form is in its elastomeric state heat is extracted to transition the polymer form from its elastomeric state to its glassy state prior to initiating the lay up of the composite materials.

In step 4, the composite material 106 is solidified while on the form to create the one-piece composite wing 100 as described above.

In step 5, the insert 104 is drawn from polymer form 102. The form is preferably in its elastomeric state to avoid damage. Although the insert 104 is rigid and cannot warp or twist, because it is "design to draw" it can be pulled directly out of form 102.

In step 6, the polymer form 102 is drawn from inside the composite wing shell 100. Because the form is not "designed to draw" it must deform without damaging either the composite wing shell or itself. Accordingly, the polymer form must be in its elastomeric state. If the polymer form is not in its elastomeric state after the cure process, heat is applied to transition to the elastomeric state. The hollow core allows the form to deform more readily and thus simplifies the drawing process. Once removed, the polymer form returns to its original shape and may be reused to form another one-piece composite wing shell 100 of the same size and shape. The insert 104 is inserted back into the polymer form 102, preferably in its elastomeric state, and process repeats steps 3 through 6. After repeated use the form may lose its shape and be discarded. Alternately, because the manufacturing processes that can be used to produce the form are so inexpensive the forms may be used only once and discarded.

Figures 5A, 5B:
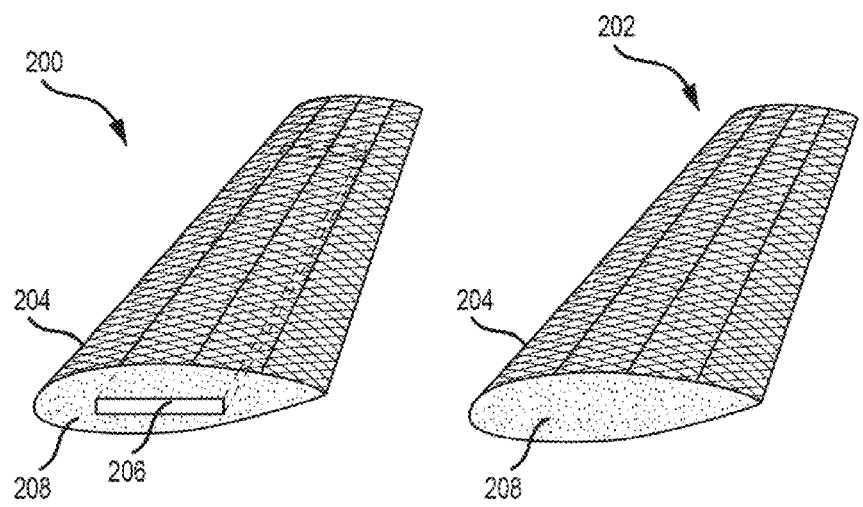
FIGS. 5a and 5b are diagrams of a composite wing shell filled with foam to form the composite wing with and without a wing box, respectively.

The low-cost manufacture of one-piece composite wings 200 and 202 from the wing shells 204 of the type manufactured with either of the described polymer form processes is shown in FIGS. 5*a* and 5*b*. In one embodiment, one or more internal structural elements 206 such as rectangular metal or PMC (polymer matrix composite) tubes are placed inside the composite wing skin to provide additional structural support. In many cases, a single structural element running down the so-called "load line" of the wing if it is possible to fit it there should be sufficient. The load line is where the center of lift occurs on the wing, and it is well known that the load line is at the quarter-chord length from the leading edge of the wing. In both embodiments, the inside of the composite wing shell is filled with a polymeric foam material 208. The polymer foam may be an injected or cast open or closed cell foam, or it may be a cast syntactic foam. The choice is a matter first of structural needs, and second convenience. The foam serves to provide buckling reinforcement for the composite wing shell, and also glues the structural element 206 in place if one is required. The foam solidifies to form a solid wing.

A process of manufacture of a one-piece composite valve 300, similar to that depicted in FIG. 1, using a two-piece form including a shaped polymer form 302 that does not draw and a rigid insert 304 designed to draw is illustrated in FIG. 6. The process is the same as we described for the manufacture of the composite wing shells. In step 1, rigid insert 304 is produced using a standard machining or casting process. As shown the insert is suitably provided with a slight taper to make it easier to draw from the polymer form. In step 2, the polymer form 302 is produced using the insert 304 as a core. In step 3, composite materials 306 are laid up on the assembled form with the polymer in either its elastomeric or glassy state depending on the requirements of a particular application. In step 4, the composite materials 306 are solidified to create composite valve 300. In step 5, the insert 304 is drawn from polymer form 302. The form is preferably in its elastomeric state to avoid damage. Although the insert 304 is rigid and cannot warp or twist because it is "design to draw" it can be pulled directly out of form 302 from the larger end. In step 6, the polymer form 302 is drawn in its elastomeric state from composite valve 300 causes the polymer to warp and twist as it is removed. Once removed the polymer returns to its original shape. The insert can be placed back into the form and the form reused to form multiple composite valves 300 of the same size and shape. Alternately, the form and possibly the insert can be discarded.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A process of manufacturing a one-piece composite part, comprising the steps of:
   (a) fabricating a shape memory polymer (SMP) into the shape of a form for a one-piece composite part and then solidifying the polymer form into its glassy state, said form having a shape that does not draw from the composite part;
   (b) with the SMP form in its glassy state, laying up a composite material on the form;
   (c) solidifying the composite material to create a one-piece composite part;
   (d) heating the SMP form to transition from its glassy state to its elastomeric state without changing shape; and
   (e) drawing the form in its elastomeric state from the one-piece composite part thereby deforming the form as it is removed, said form returning to its original shape for the one-piece composite part upon removal.

2. The process of manufacture of claim 1, wherein the step of forming the SMP into a form comprises a compression molding or injection molding.

3. The process of manufacture of claim 1, wherein the process uses a SMP without using its shape-memory properties.

4. The process of manufacture of claim 1, further comprising:
   (f) cooling the form to transition from its elastomeric state to its glassy state; and
   (g) repeating steps (b) through (f) with the same form to produce a plurality of the same composite parts.

5. A process of manufacturing a one-piece composite wing shell, comprising the steps of:
   (a) forming a shape memory polymer (SMP) into the shape of a form for a one-piece composite wing shell and solidifying the polymer form into its glassy state, said form having a twist or taper and camber that does not draw from the composite wing shell;
   (b) with the SMP form in its glassy state, laying up a composite material on the form;
   (c) solidifying the composite material to form a one-piece composite wing shell;
   (d) heating the form to transition from its glassy state to its elastomeric state without changing shape; and
   (e) drawing the form in its elastomeric state from the one-piece composite wing shell thereby deforming the form as it is removed, said form returning to its original shape upon removal.

6. The process of manufacture of claim 5, wherein said composite wing shell has a specified twist, taper and camber.

7. The process of manufacture of claim 5, further comprising:
   (f) cooling the form to transition from its elastomeric state to its glassy state; and
   (g) repeating steps (b) through (f) with the same form to produce a plurality of the same composite wing shells.

8. The process of manufacture of claim 7, further comprising for each said composite wing shell,
   (h) injecting polymer foam inside the composite wing shell to form a one-piece composite wing with the specified twist or taper and camber.

9. The process of manufacture of claim 8, further comprising for each said composite wing shell inserting a wing box into the composite shell prior to injecting the foam.

10. The process of manufacture of claim 5, further comprising for each said composite wing shell,
    (f) injecting foam inside the composite wing shell to form a one-piece composite wing with the specified twist or taper and camber.

11. The process of manufacture of claim 10, wherein the foam comprises open or closed cell foam or syntactic foam.

* * * * *